US010533244B2

(12) United States Patent
Hanaoka et al.

(10) Patent No.: US 10,533,244 B2
(45) Date of Patent: Jan. 14, 2020

(54) METHOD OF PRODUCING HOT FORGED PRODUCT USING BRASS AND HOT FORGED PRODUCT AND WETTED PRODUCT SUCH AS VALVE AND WATER FAUCET MOLDED USING THE SAME

(71) Applicant: KITZ CORPORATION, Chiba (JP)

(72) Inventors: Junichi Hanaoka, Nagano (JP); Kazuhito Kurose, Nagano (JP)

(73) Assignee: KITZ CORPORATION, Chiba (JP)

( * ) Notice: Subject to any disclaimer, the term of this patent is extended or adjusted under 35 U.S.C. 154(b) by 276 days.

(21) Appl. No.: 15/306,805

(22) PCT Filed: Apr. 30, 2015

(86) PCT No.: PCT/JP2015/063029
§ 371 (c)(1),
(2) Date: Oct. 26, 2016

(87) PCT Pub. No.: WO2015/166998
PCT Pub. Date: Nov. 5, 2015

(65) Prior Publication Data
US 2017/0211169 A1 Jul. 27, 2017

(30) Foreign Application Priority Data
Apr. 30, 2014 (JP) ................................ 2014-094136

(51) Int. Cl.
C22F 1/08 (2006.01)
C22C 9/04 (2006.01)
(Continued)

(52) U.S. Cl.
CPC .................. C22F 1/08 (2013.01); C22C 9/04 (2013.01); F16K 27/067 (2013.01); C22F 1/00 (2013.01)

(58) Field of Classification Search
None
See application file for complete search history.

(56) References Cited

U.S. PATENT DOCUMENTS

| 6,458,222 | B1 * | 10/2002 | Matsubara | ................ C22F 1/08 148/433 |
| 2004/0159375 | A1 * | 8/2004 | Yamagishi | ................ C22C 9/04 148/433 |
| 2014/0251488 | A1 * | 9/2014 | Oishi | ........................ C22C 9/04 138/177 |

FOREIGN PATENT DOCUMENTS

EP 0947592 A1 * 10/1999
EP 1029939 A1 * 2/2000
(Continued)

OTHER PUBLICATIONS

Sadayappan, M. et al., "Grain Refinement of Permanent Mold Cast Copper Base Alloys", Materials Technology Laboratory, Apr. 2004.*
(Continued)

Primary Examiner — George Wyszomierski
(74) Attorney, Agent, or Firm — Wenderoth, Lind & Ponack, L.L.P.

(57) ABSTRACT

To contribute to an improvement in a dezincification resistance of a copper alloy, focusing attention on a relation between a dezincification resistance of a copper alloy and the crystal grain size of an α phase, and the specific object is to provide a method of producing a hot forged product using a lead-free brass capable of ensuring corrosion resistances such as a prescribed dezincification resistance and the like even at sites of different thickness and shape, a hot forged product, and a wetted product such as a valve and a water faucet, molded using the same. A method of producing a hot forged product using a brass, comprising heat-treating a raw material to be subjected to forging work using a brass having a composition containing at least 59.2 to 63.0% by
(Continued)

mass of Cu, 1.00 to 2.00% by mass of Sn and 0.05 to 0.25% by mass of Pb and containing the residue composed of Zn and inevitable impurities at a heating rate of 5.2° C./s or more from 350° C. until reaching the forging temperature.

20 Claims, 7 Drawing Sheets

(51) Int. Cl.
*F16K 27/06* (2006.01)
*C22F 1/00* (2006.01)

(56) References Cited

FOREIGN PATENT DOCUMENTS

| | | |
|---|---|---|
| JP | 61-213333 | 9/1986 |
| JP | 2007-517981 | 7/2007 |
| JP | 2009-74156 | 4/2009 |
| WO | 98/10106 | 3/1998 |
| WO | 2014/069020 | 5/2014 |

OTHER PUBLICATIONS

"Low-lead, cadmium-free, high-corrosion-resistance", Keepalloy II XA Metal, dated Nov. 7, 2013, in Japanese, with English translations of two website pages, http://www.kitzmetalworks.com/english/products_sp_keepalloy2_xa.html and http://www.kitzmetalworks.com/english/products_sp_keepalloy2_xc.html .
International Search Report dated Aug. 11, 2015 in International Application No. PCT/JP2015/063029.

* cited by examiner

Fig. 3
(a)
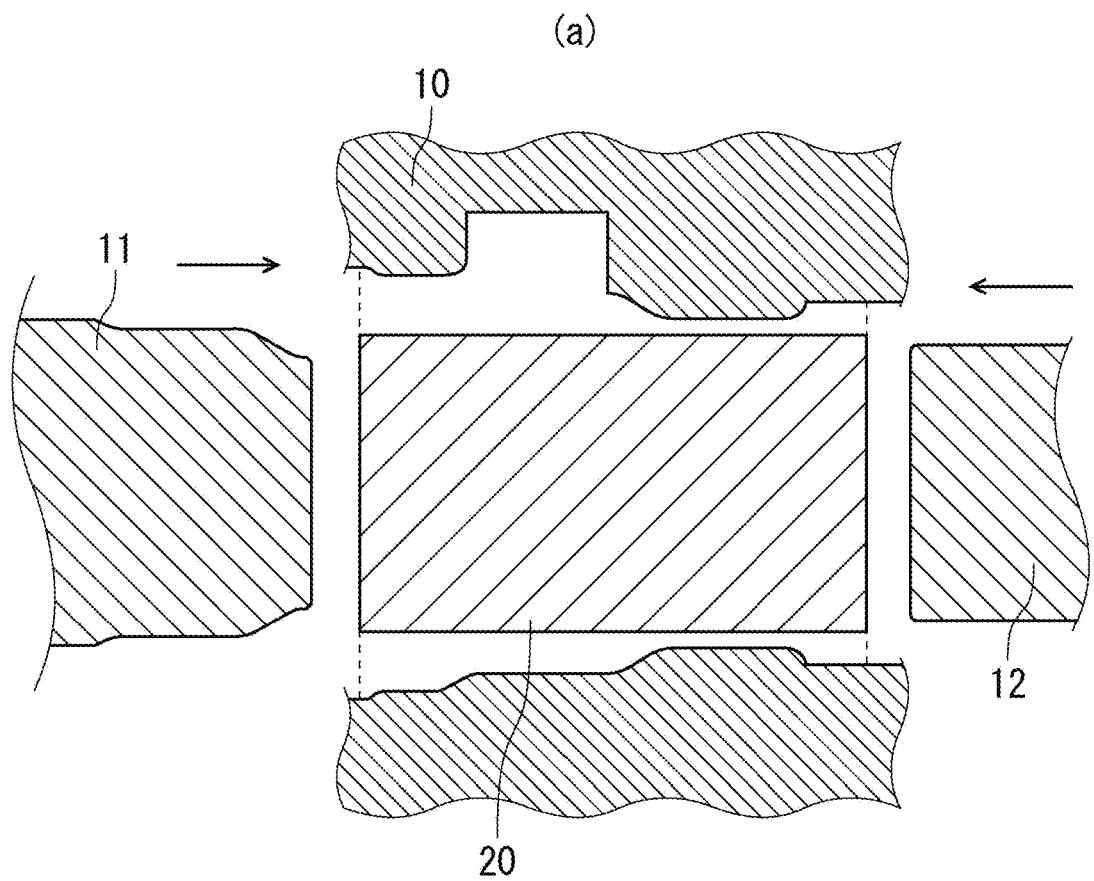
(b)
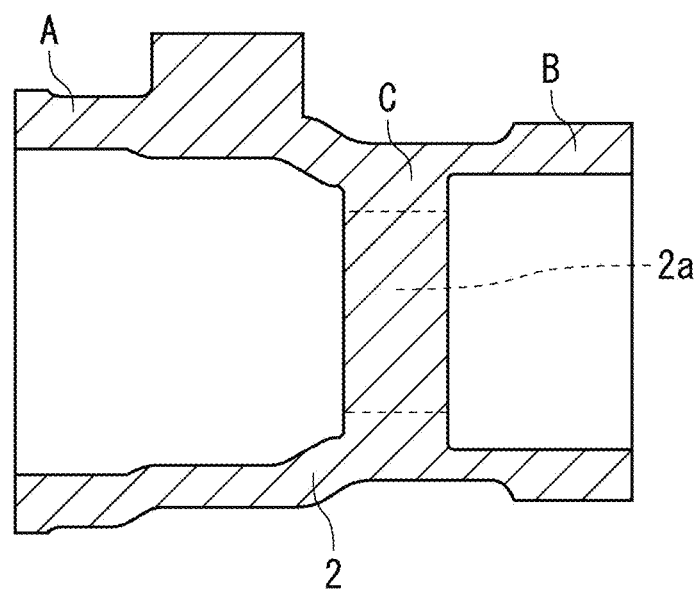

METHOD OF PRODUCING HOT FORGED PRODUCT USING BRASS AND HOT FORGED PRODUCT AND WETTED PRODUCT SUCH AS VALVE AND WATER FAUCET MOLDED USING THE SAME

TECHNICAL FIELD

The present invention relates to a method of producing a hot forged product using brass, particularly relates to a method of producing a hot forged product for securing corrosion resistances when using a lead-free brass alloy as a raw material, a hot forged product, and a wetted product such as a valve and a water faucet molded using the same.

BACKGROUND ART

For improving a dezincification resistance among corrosion resistances of α+β brass and α+β+γ brass, it is conventionally general that crystallization of a β phase which is electrically lowest in the metallographic structure is suppressed by lowering the Zn equivalent to relatively increase the Cu content, and the remaining β phase is allowed to undergo α transition by a thermal treatment. Additionally, it is known that it is effective to add P, Sb, As and Sn as an additive element.

For improving a stress corrosion cracking resistance among corrosion resistances, addition of Pb which is electrically lower and not solid-solved in a matrix is most general, however, in the case of a lead-free copper alloy, it is known that it is effective to add 1.0% or more of Sn as an alternative to Pb because the Pb content should be suppressed. Addition of Sn, however, leads to lowering of cold mechanical properties such as elongation and impact value, thus, problems occur in cold working and cutting work in some cases. Then, in alloy design, the Sn content is suppressed to the minimum necessary, in view of practical ranges of elongation and impact value.

As described above, very delicate alloy design is required for controlling corrosion resistance and characteristics such as mechanical properties in practically effective ranges in a lead-free copper alloy. Also in the past, a corrosion resistance of a forged product is studied in view of these points.

For improving corrosion resistances of a forged product by a thermal treatment, for example, a copper alloy containing 60 to 63% by mass of Cu is subjected to a thermal treatment at 350° C. to 650° C. after hot forging, thereby causing α transition of the structure, trying to improve a dezincification resistance, in Patent document 1. Further, the same document describes that when gradual cooling at a rate of 10° C./sec or less is conducted after hot forging, a β phase is fragmented and surrounded by an α phase, resulting in an improvement in a dezincification resistance.

In Patent document 2, corrosion resistances of a lead-free brass alloy are intended to be improved, and a brass alloy containing 55 to 65% by weight of copper is subjected to extrusion at a temperature of 630 to 720° C., then, to an intermediate thermal treatment at a temperature of 420 to 700° C., then, to annealing at a temperature of 400° C. or lower, to eliminate stress.

PRIOR ART DOCUMENT

Patent Document

Patent document 1: JP-A No. 2009-74156
Patent document 2: Japanese Patent Application National Publication No. 2007-517981

SUMMARY OF THE INVENTION

Problems to be Solved by the Invention

Patent document 1 intends to promote α transition of a hot forged product by treating at a thermal treatment temperature and a cooling rate under predetermined conditions, however, this production method only tries to improve a dezincification resistance by relatively increasing the content of an α phase of a forged product with respect to the whole material, and it has become apparent by an experiment described later that, actually, in sites of low degree of working by hot forging such as thicker sites, α transition does not progress and the crystal grain size of an α phase remains large, and a phenomenon of partial deficiency of a prescribed dezincification resistance is observed. Such a phenomenon is observed in so-called 4-6 brass including also a lead free brass as in Patent document 2, and it is not recognized that all sites of a forged product obtained by the production method as in Patent document 1 can satisfy the intended dezincification resistance, thus, operations such as further treatments and selection and the like are necessary.

The present invention has been accomplished in view of this point and an object thereof is to contribute to an improvement in a dezincification resistance of a copper alloy, focusing attention on a relation between a dezincification resistance of a copper alloy and the crystal grain size of an α phase, and the specific object is to provide a method of producing a hot forged product using a lead-free brass capable of ensuring corrosion resistances such as a prescribed dezincification resistance and the like even at sites of different thickness and shape, a hot forged product, and a wetted product such as a valve and a water faucet, molded using the same.

Means for Solving the Problem

For attaining the above-described object, an invention of embodiment 1 is a method of producing a hot forged product using a brass, comprising heat-treating a raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities at a heating rate of 5.2° C./s or more from 350° C. until reaching the forging temperature.

An invention of embodiment 2 is the method of producing a hot forged product using a brass according to embodiment 1, wherein the brass contains 0.05 to 0.29% by mass of Sb and/or 0.05 to 0.20% by mass of P.

An invention of embodiment 3 is the method of producing a hot forged product using a brass according to embodiment 2, wherein the brass contains 0.15% by mass or less of Fe.

An invention of embodiment 4 is the method of producing a hot forged product using a brass according to embodiment 1, wherein the brass contains 0.05 to 0.29% by mass of Sb and 0.15% by mass or less of Ni.

An invention of embodiment 5 is the method of producing a hot forged product using a brass according to embodiment 4, wherein the brass contains 0.05 to 0.20% by mass of P.

An invention of embodiment 6 is a method of producing a hot forged product using a brass, comprising heating a raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities from 350° C. until reaching the forging temperature, wherein the heating rate is set so that the coarsening rate of the crystal grain size in a region of low degree of working by hot forging is 50% or less.

An invention of embodiment 7 is the method of producing a hot forged product using a brass according to embodiment 6, wherein the brass contains 0.05 to 0.29% by mass of Sb and/or 0.05 to 0.20% by mass of P.

An invention of embodiment 8 is the method of producing a hot forged product using a brass according to embodiment 7, wherein the brass contains 0.15% by mass or less of Fe.

An invention of embodiment 9 is the method of producing a hot forged product using a brass according to embodiment 6, wherein the brass contains 0.05 to 0.29% by mass of Sb and 0.15% by mass or less of Ni.

An invention of embodiment 10 is the method of producing a hot forged product using a brass according to embodiment 9, wherein the brass contains 0.05 to 0.20% by mass of P.

An invention of embodiment 11 is a hot forged product using a brass, wherein a raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities is heat-treated at a heating rate of 5.2° C./s or more from 350° C. until reaching the forging temperature.

An invention of embodiment 12 is the hot forged product using a brass according to embodiment 11, wherein the brass contains 0.05 to 0.29% by mass of Sb and/or 0.05 to 0.20% by mass of P.

An invention of embodiment 13 is the hot forged product using a brass according to embodiment 12, wherein the brass contains 0.15% by mass or less of Fe.

An invention of embodiment 14 is the hot forged product using a brass according to embodiment 11, wherein the brass contains 0.05 to 0.29% by mass of Sb and 0.15% by mass or less of Ni.

An invention of embodiment 15 is the hot forged product using a brass according to embodiment 14, wherein the brass contains 0.05 to 0.20% by mass of P.

An invention of embodiment 16 is a wetted product such as a valve and a water faucet, molded using the hot forged product as described in any one of embodiments 11 to 15.

An invention of embodiment 17 is a method of producing a hot forged product using a brass, comprising heating a raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities at a heating rate of 5.2° C./s or more from 350° C. until reaching the forging temperature, wherein the cooling rate from the forging temperature to 350° C. after forging is 2° C./s or more.

An invention of embodiment 18 is the method of producing a hot forged product using a brass according to embodiment 17, wherein the brass contains 0.05 to 0.29% by mass of Sb and/or 0.05 to 0.20% by mass of P.

An invention of embodiment 19 is the method of producing a hot forged product using a brass according to embodiment 18, wherein the brass contains 0.15% by mass or less of Fe.

An invention of embodiment 20 is the method of producing a hot forged product using a brass according to embodiment 17, wherein the brass contains 0.05 to 0.29% by mass of Sb and 0.15% by mass or less of Ni.

An invention of embodiment 21 is the method of producing a hot forged product using a brass according to embodiment 20, wherein the brass contains 0.05 to 0.20% by mass of P.

An invention of embodiment 22 is a hot forged product using a brass, wherein a raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities is heated at a heating rate of 5.2° C./s or more from 350° C. until reaching the forging temperature and the cooling rate from the forging temperature to 350° C. after forging is 2° C./s or more.

An invention of embodiment 23 is the hot forged product using a brass according to embodiment 22, wherein the brass contains 0.05 to 0.29% by mass of Sb and/or 0.05 to 0.20% by mass of P.

An invention of embodiment 24 is the hot forged product using a brass according to embodiment 23, wherein the brass contains 0.15% by mass or less of Fe.

An invention of embodiment 25 is the hot forged product using a brass according to embodiment 22, wherein the brass contains 0.05 to 0.29% by mass of Sb and 0.15% by mass or less of Ni.

An invention of embodiment 26 is the hot forged product using a brass according to embodiment 25, wherein the brass contains 0.05 to 0.20% by mass of P.

An invention of embodiment 27 is a wetted product such as a valve and a water faucet, molded using the hot forged product as described in any one of embodiments 22 to 26.

An invention of embodiment 28 is a method of producing a hot forged product using a brass, comprising heating a raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities at a heating rate of 5.2° C./s or more from 350° C. until reaching the forging temperature, wherein the cooling rate from the forging temperature to 350° C. after forging is 2° C./s or more and less than 142° C./s.

An invention of embodiment 29 is the method of producing a hot forged product using a brass according to embodiment 28, wherein the brass contains 0.05 to 0.29% by mass of Sb and/or 0.05 to 0.20% by mass of P.

An invention of embodiment 30 is the method of producing a hot forged product using a brass according to embodiment 29, wherein the brass contains 0.15% by mass or less of Fe.

An invention of embodiment 31 is the method of producing a hot forged product using a brass according to embodiment 28, wherein the brass contains 0.05 to 0.29% by mass of Sb and 0.15% by mass or less of Ni.

An invention of embodiment 32 is the method of producing a hot forged product using a brass according to embodiment 31, wherein the brass contains 0.05 to 0.20% by mass of P.

An invention of embodiment 33 is a hot forged product using a brass, wherein a raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities is heated at a heating rate of 5.2° C./s or more from 350° C. until reaching the forging temperature and the cooling rate from the forging temperature to 350° C. after forging is 2° C./s or more and less than 142° C./s.

An invention of embodiment 34 is the hot forged product using a brass according to embodiment 33, wherein the brass contains 0.05 to 0.29% by mass of Sb and/or 0.05 to 0.20% by mass of P.

An invention of embodiment 35 is the hot forged product using a brass according to embodiment 34, wherein the brass contains 0.15% by mass or less of Fe.

An invention of embodiment 36 is the hot forged product using a brass according to embodiment 33, wherein the brass contains 0.05 to 0.29% by mass of Sb and 0.15% by mass or less of Ni.

An invention of embodiment 37 is the hot forged product using a brass according to embodiment 36, wherein the brass contains 0.05 to 0.20% by mass of P.

An invention of embodiment 38 is a wetted product such as a valve and a water faucet, molded using the hot forged product as described in any one of embodiments 33 to 37.

An invention of embodiment 39 is a hot forged product having a composition containing at least 59.2 to 63.0% by mass of Cu, 1.00 to 2.00% by mass of Sn and 0.05 to 0.25% by mass of Pb and containing the residue composed of Zn and inevitable impurities, wherein the average crystal grain size of an α phase of a region of low degree of working as a forging center region of this forged product is 8.5 μm or less.

An invention of embodiment 40 is the hot forged product according to embodiment 39, using a brass containing 0.05 to 0.29% by mass of Sb and/or 0.05 to 0.20% by mass of P.

An invention of embodiment 41 is the hot forged product according to embodiment 40, using a brass containing 0.15% by mass or less of Fe.

An invention of embodiment 42 is the hot forged product according to embodiment 39, using a brass containing 0.05 to 0.29% by mass of Sb and 0.15% by mass or less of Ni.

An invention of embodiment 43 is the hot forged product according to embodiment 42, using a brass containing 0.05 to 0.20% by mass of P.

Effect of the Invention

According to the invention of embodiments 1 to 16, by controlling the heating rate of a raw material in conducting hot forging work using a brass alloy, a low-leaded brass having no possibility of causing an adverse effect on a human body can be fabricated while dramatically improving a dezincification resistance, and by conducting heating up to the forging temperature while controlling the heating rate up to the forging temperature of a forging raw material at 5.2° C./s or more in forging, the coarsening rate of the crystal grain size can be suppressed to 50% or less, and a dezincification resistance can be improved even if thicknesses of sites vary significantly. By inclusion of a low-leaded alloy, recyclability of a copper alloy can be made possible and machinability and a stress corrosion cracking resistance can be improved.

According to the invention of embodiments 17 to 27, a lead-free brass having no possibility of causing an adverse effect on a human body can be fabricated while drastically improving a dezincification resistance in conducting hot forging work using a brass alloy, and by heating the brass at a heating rate of 5.2° C./s or more from 350° C. until reaching the forging temperature and adjusting the cooling rate from the forging temperature to 350° C. after forging to 2° C./s or more, coarsening of a crystal generating in this temperature range can be prevented effectively, and fabrication by a uniform brass alloy is made possible while suppressing the crystal coarsening rate to 30% or less.

According to the invention of embodiments 28 to 38, a lead-free brass having no possibility of causing an adverse effect on a human body can be fabricated while drastically improving a dezincification resistance in conducting hot forging work using a brass alloy, and by heating the brass at a heating rate of 5.2° C./s or more from 350° C. until reaching the forging temperature and adjusting the cooling rate from the forging temperature to 350° C. after forging to 2° C./s or more and less than 142° C./s, the crystal coarsening rate is suppressed to 30% or less, and additionally, fine fragmentation of a γ phase depositing in the crystalline structure after α transition annealing is prevented, thus, a dezincification resistance can be improved while preventing lowering of a stress corrosion cracking resistance.

According to the invention of embodiments 39 to 43, by regulating the heat history before forging and after forging by an appropriate heat treatment apparatus or cooling treatment apparatus, the average crystal grain size of an α phase of a region of low degree of working as a center region of a forged product can be adjusted to 8.5 μm or less, and coarsening of the crystal grain size can be suppressed and a dezincification resistance can be improved even in any regions of different degrees of working.

BRIEF EXPLANATION OF DRAWINGS

FIG. 3 is a cross-sectional view showing a forging step of a valve body.

MODES FOR CARRYING OUT THE INVENTION

Embodiments of a method of producing a hot forged product using a brass, a hot forged product, and a wetted product such as a valve and a water faucet molded using the same in the present invention will be illustrated referring to drawings below.

First, for improvement of a dezincification resistance of a copper alloy, a hot forged product of a body 2 of a ball valve 1 described later was molded using a lead-free brass alloy, and the dezincification resistance at each site in this hot forged product was researched in detail.

As a result, it has been found that when a hot forged product is subjected to α transition annealing, there is a site of poorly effective action of α transition depending on the site of a forged product, and a dezincification corrosion resistance lowers at this site. For such partial lowering of a dezincification corrosion resistance, the following two large reasons are envisaged.

(i) At a site where a raw material hardly undergoes deformation in a hot forging step, namely, at a site of low degree of working, dynamic recrystallization by hot working poorly occurs, and as a result, the crystal grain is coarse and diffusion of an element such as Sn requires time in an α transition annealing step.

(ii) Since residual stress in the structure is eliminated by going of a forged product through a radiational step after hot working, driving force effective for α transition is low.

Figure 1:
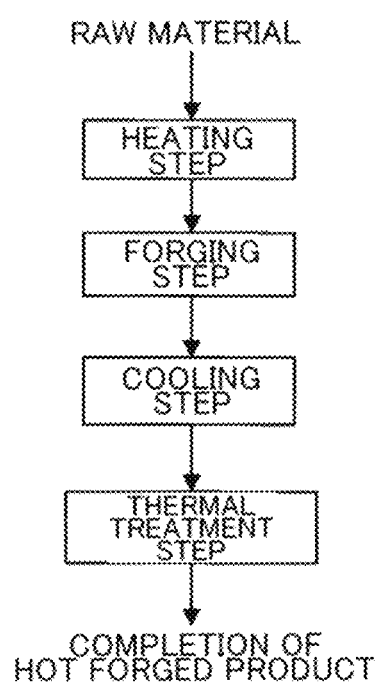
FIG. 1 is a flow chart showing a working step of a hot forged product.

For suppressing partial lowering of a dezincification corrosion resistance of a copper alloy causing from these reasons (i) and (ii), the method of producing a hot forged product using a brass of the present invention heat-treats a raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities, namely, a raw material made of the brass, at a heating rate of 5.2° C./s or more from 350° C. until reaching the forging temperature, in completing a hot forged product of a raw material via, for example, working steps shown in a flow chart of FIG. 1, that is, via a heating step, a forging step, a cooling step and a thermal treatment step, and by this process, a hot forged product is molded, and it becomes possible to mold, for example, a wetted product such as a valve and a water faucet using this hot forged product. In the present embodiment, a high-frequency furnace is used in the heating step, and an electrical fan is used as forced air cooling and a thermal protective material is used as thermal insulation in the cooling step, however, the instruments are not limited to them and arbitrary instruments and the like can be used. The thermal treatment step is an optional step which is conducted if necessary.

A raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities is heated at a heating rate of 5.2° C./s or more from 350° C. until reaching the forging temperature, and the cooling rate from the forging temperature to 350° C. after forging is adjusted to 2° C./s or more, and a hot forged product is molded by this method of producing a hot forged product using a brass, and it becomes possible to mold, for example, a wetted product such as a valve and a water faucet using this hot forged product.

A raw material to be subjected to forging work using a brass having a composition containing at least 59.2 to 63.0% by mass of Cu, 1.00 to 2.00% by mass of Sn and 0.05 to 0.25% by mass of Pb and containing the residue composed of Zn and inevitable impurities is heated at a heating rate of 5.2° C./s or more from 350° C. until reaching the forging temperature, and the cooling rate from the forging temperature to 350° C. after forging is adjusted to 2° C./s or more and less than 142° C./s, and a hot forged product is molded by this method of producing a hot forged product using a brass, and it becomes possible to mold, for example, a wetted product such as a valve and a water faucet using this hot forged product.

In these cases, a hot forged product in which the average crystal grain size of an α phase of a region of low degree of working as a forging center region of a forged product is 8.5 μm or less is desirable.

The above-described brass may contain 0.05 to 0.29% by mass of Sb and/or 0.05 to 0.20% by mass of P, and if necessary, may further contain 0.15% by mass or less of Fe.

The above-described brass may contain 0.05 to 0.29% by mass of Sb and 0.15% by mass or less of Ni, and if necessary, may further contain 0.05 to 0.20% by mass of P.

Next, elements contained in a brass as a raw material for forging and desirable composition ranges thereof and reasons for them, in the method of producing a hot forged product using a brass of the present invention, are explained.

Cu: 59.2 to 63.0% by Mass

A brass product is produced via steps of hot working (hot extrusion, hot forging) and cold working. Further, mechanical properties, machinability and corrosion resistances are required as material characteristics depending on the application.

The Cu content is determined considering them, and normally, the Cu content should be adjusted depending on the contents of Sn, Ni, Sb and P added into a brass alloy for various purposes, while in the present invention, Cu is used as an essential element and the component range is determined roughly as described below.

For obtaining stable cold workability, the lower limit of Cu is 59.2% by mass, and for hot workability, it is generally known that it is important to regulate a β phase having high deformation ability at about 600 to 800° C. to have a Cu content of 60% or more and less than 100%. It is advantageous that the upper limit of the Cu content satisfying such conditions is 63.0% by mass, more preferably 62.5% by mass.

In this case, by restricting the upper limit to 61.9% by mass or less, hot workability is stabilized and machinability is improved. Especially when used for hot forging, the upper limit should be restricted to around 61.0% by mass, and for ensuring more excellent hot forgibility, 60.8% by mass or less is advantageous.

When used for cold working, the lower limit is advantageously 59.2% by mass since ensuring excellent elongation is necessary, and for obtaining further excellent cold workability, 61.0% by mass or more is advantageous. For obtaining a more excellent dezincification resistance, it is advantageous that the lower limit is 60.0% by mass.

Sn: 1.00 to 2.00% by Mass

Sn is an essential element for improving corrosion resistances such as a stress corrosion cracking resistance (SCC resistance), a dezincification resistance and an erosion-corrosion resistance in a brass alloy. For depositing a γ phase and improving a SCC resistance by inclusion of Sn, inclusion of 1.00% by mass or more of Sn is necessary. For securing a SCC resistance equal to or more than that of a lead-containing brass such as C3771 and C3604, inclusion of 1.20% by mass or more of Sn utilizing a synergistic effect of Sb and Ni described later is desirable, and when 1.40% by mass or more of Sn is contained, a SCC resistance can be secured while particularly thinking a great deal of hot workability of a forged valve having relatively large caliber and a thin forged product. In contrast, inclusion of Sn hardens a metal, lowers mechanical properties (particularly, elongation) and possibly damages reliability of a product, thus, the content is 2.00% by mass or less, more preferably 1.80% by mass or less. When particularly thinking a great deal of cold workability, the content is 1.30% by mass or less, and for obtaining excellent cold workability, the content is desirably 1.60% by mass or less.

Pb: 0.05 to 0.25% by Mass

If the upper limit of Pb is strictly managed, use of limited dissolved materials is forced, causing an increase of cost of an alloy, therefore, it is desirable that a certain amount of Pb is allowed from the standpoint of recyclability. Since Pb is harmful for a human body, the lower limit is 0.05% by mass, while the upper limit is desirably 0.25% by mass or less depending on the product shape, on the premise of clearing NSF61-Section8-Annex F which is one elution criterion for tap water. Since Pb is permitted up to 0.25% by mass in terms of the weighted average of a wetted part according to NSF61-Annex G which is one regulation of Pb inclusion, is it desirable that the upper limit of lead is 0.25% by mass also for complying with this standard. When 4% by mass which is a provisional standard directed by Rohs is abolished, there is high possibility that the upper limit of Pb is 0.10% by mass. Therefore, when used in electric and electronic parts, the upper limit of Pb is desirably 0.10% by mass. Further, when registration as an antibacterial raw material of CDA is considered, it is desirable that the upper limit is 0.09% by mass.

Sb: 0.05 to 0.29% by Mass

Sb is known as an element for improving a dezincification resistance and a SCC resistance of a brass alloy, and is an element which improves and stabilizes a SCC resistance in combination with inclusion of Sn, further, dramatically improves a SCC resistance by a synergistic effect with Ni. For improving a dezincification resistance and a SCC resistance, inclusion of 0.05% by mass is necessary, and the effect is obtained more surely by inclusion of 0.07% by mass or more. Since these effects are saturated when contained excessively, it is desirable that the minimum necessary content for obtaining corrosion resistances is 0.15% by mass, more preferably, the upper limit is 0.10% by mass.

Sb is known as an element for improving machinability of a brass alloy by inclusion of 0.30 to 2.00% by mass, and on the premise of deposition of a γ phase by inclusion of 1.00% by mass or more of Sn, an effect of improving machinability (particularly, chip crushability) can be obtained by solid-solving Sb in this γ phase even if the content of Sb is 0.29% by mass or less. By this, reduction of elongation due to generation of intermetallic compounds by inclusion of excess Sb can be prevented. The machinability improving effect is obtained at a content of at least 0.07% by mass or more.

P: 0.05 to 0.20% by Mass

P is an element known as an element for improving a dezincification resistance of a brass. Inclusion of P together with inclusion of Sb is indispensable when there are strict requirements for a dezincification resistance such as a maximum dezincification corrosion depth of 200 μm in the dezincification corrosion resistance test of ISO6509-1981. The dezincification resistance improving effect of P is obtained by inclusion of 0.05% by mass or more, and more surely, 0.08% by mass or more is advantageous. Since excess inclusion decreases particularly hot workability by generation of hard intermetallic compounds, it is advantageous that the upper limit is 0.20% by mass, more preferably 0.15% by mass.

P is an element for improving machinability (particularly, chip crushability) by the above-described generation of intermetallic compounds, and a remarkable effect is obtained at around 0.08% by mass at which an intermetallic compound of P is generated. The effect of improving machinability becomes larger together with an increase in the content of P, however, it is advantageous that the upper limit is 0.15% by mass, more preferably 0.10% by mass, in consideration also of the above-described lowering of hot workability.

Fe: 0.15% by Mass or Less

Fe is an optional component, and when its content is high, a cutting property of an alloy lowers by deposition of hard intermetallic compounds, and there is a possibility of generation of adverse effects such as an increase of exchange frequency of a cutting tool. For this reason, the content of Fe is 0.15% by mass or less, and when higher corrosion resistances are required, it is 0.01% by mass or less.

Ni: 0.50% by Mass or Less

Ni is known as an element for improving mechanical properties and corrosion resistances of a brass alloy. It is a general opinion that Ni has a slight effect on a SCC resistance, and it has become apparent that when Ni is included in an alloy composed of 40/60 brass+Sn (naval brass) as a base, a SCC resistance lowers. In contrast, when 40/60 brass+Sn+Sb is a base and Ni is included, a SCC resistance improves in a range of 1.00 to 1.80% by mass of Sn (preferably, 1.10 to 1.60% by mass of Sn) and 0.05 to 0.15% by mass of Sb (preferably, 0.08 to 0.10% by mass of Sb), that is, presence of a synergistic effect by Sb and Ni on a SCC resistance has become apparent. By this, it is possible to improve and stabilize a SCC resistance dramatically and to lower the content of Sn reducing elongation. Therefore, Ni is contained as an optional element in the present invention. The SCC resistance improving effect of Ni is obtained by inclusion of 0.05% by mass or more, and becomes more assured by inclusion of 0.10% by mass or more. Since excess inclusion lowers machinability by generation of hard intermetallic compounds, the upper limit is 0.50% by mass, and since Ni is also an element for decreasing hot ductility, it is advantageous that the upper limit is more preferably 0.25% by mass.

Inevitable Impurities: Si, Mn, Bi

Inevitable impurities according to an embodiment of a lead-free brass alloy in the present invention include Si, Mn and Bi. Of them, when Si or Mn is contained, a cutting property of an alloy lowers by deposition of hard intermetallic compounds, and adverse effects such as an increase of exchange frequency of a cutting tool occur. Therefore, the content of Si is regulated to 0.10% by mass or less and the content of Mn is regulated to 0.03% by mass or less, and they are used as inevitable impurities exerting little influence on a cutting property.

When a large amount of Bi is contained, the content is regulated to 0.03% by mass or less for suppressing embrittlement due to a Bi—Pb eutectic crystal, depending on the content of Pb.

In addition, the content of As is 0.10% by mass or less, the content of Al is 0.03% by mass or less, the content of Ti is 0.01% by mass or less, the content of Zr is 0.10% by mass or less, the content of Co is 0.30% by mass or less, the content of Cr is 0.30% by mass or less, the content of Ca is 0.10% by mass or less, the content of B is 0.10% by mass or less, the content of Se is 0.10% by mass or less and the content of Cd is 75 ppm or less, and these are mentioned as examples of inevitable impurities.

Based on the above-described elements, a lead-free brass alloy used as a raw material in the method of producing a hot forged product of the present invention is constituted. The lead-free denotes a low-leaded brass alloy containing a trace amount of lead, and widely includes compounds having Pb as an inevitable impurity. Specifically, the lead-free brass alloy denotes a brass alloy permitting inclusion of 0.05 to 0.25% of Pb.

EXAMPLES

By molding a hot forged product using a brass alloy having a composition in the range described above according to the method of producing a hot forged product of the present invention described above, it becomes possible to ensure a dezincification resistance at all sites of this forged product. The ground for this is explained together with examples below.

First, attention was paid to a relation between a dezincification property and the crystal grain size of an α phase of a copper alloy and an influence exerted by a difference of the crystal grain size on a dezincification resistance of a copper alloy was examined for clarifying the object of the present invention and improving a dezincification resistance of a hot forged product made of a lead-free brass.

In this examination, the crystal grain size of a forging raw material was measured, the crystal grain size at each site of a forged product obtained by hot forging this raw material was measured again, thereafter, an α transition thermal treatment was carried out at a treatment temperature of 470° C. for a treatment time of 2.5 hours, and a dezincification corrosion resistance test of ISO6509-1981 was performed on this, and the maximum dezincification corrosion depth was measured. The heating rate from 350° C. until reaching a forging temperature of 740° C. in the present test piece was 0.53° C./s, and radiational cooling (air cooling) was adopted after forging.

Figure 2:
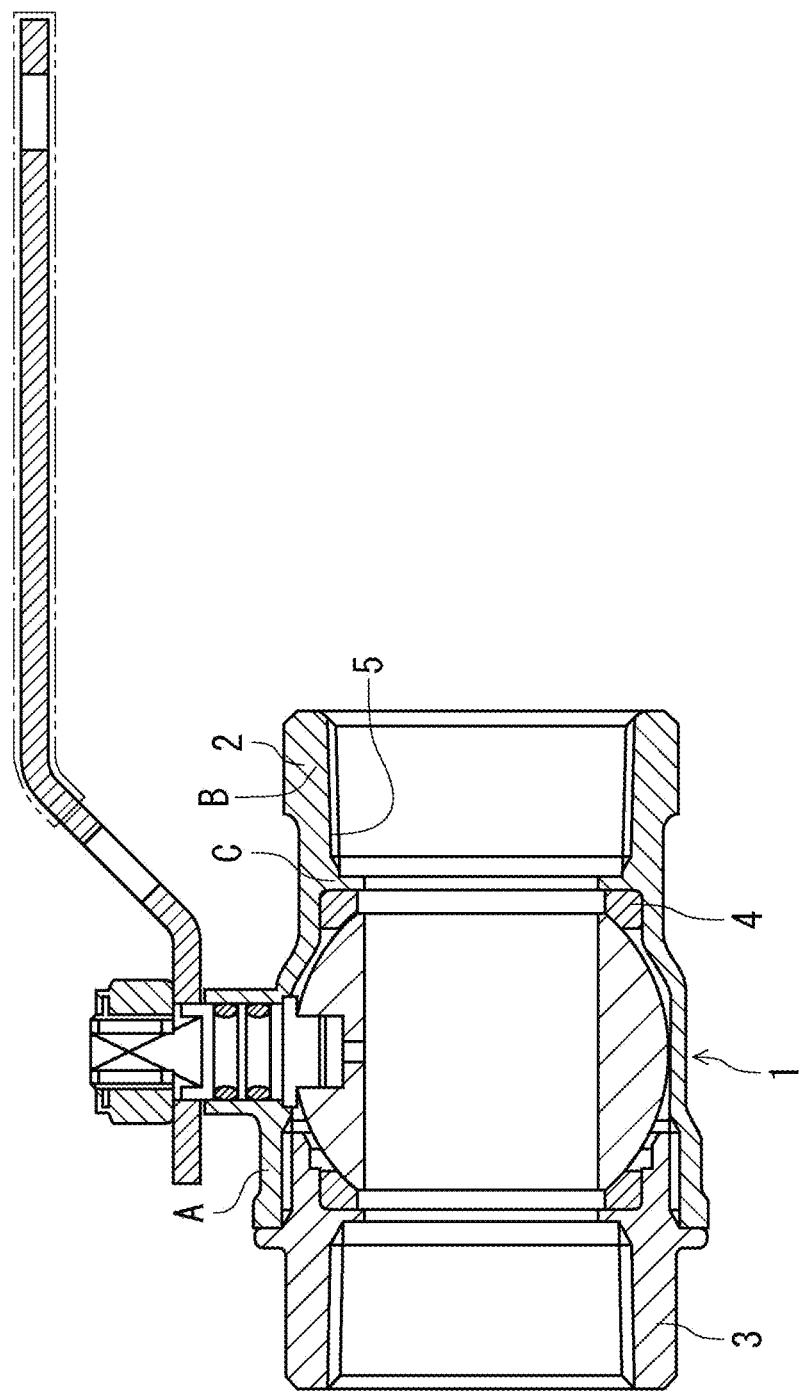
FIG. 2 is a cross-sectional view showing a ball valve.

A cylindrical brass alloy of diameter φ8 mm×66 mm Was used as a forging raw material, and this was forging-worked to mold a body 2 of a screw type two-piece structured ball valve (valve nominal diameter: 1¼ inch) 1 show in FIG. 2. The chemical components of this body 2 are shown in Table 1.

TABLE 1

| | chemical component (% by mass) | | | | | | | |
|---|---|---|---|---|---|---|---|---|
| | Cu | Pb | Fe | Sn | P | Sb | Ni | Zn |
| body 11/4 | 60.6 | 0.17 | 0.00 | 1.56 | 0.09 | 0.08 | 0.17 | residue |

Figure 4:
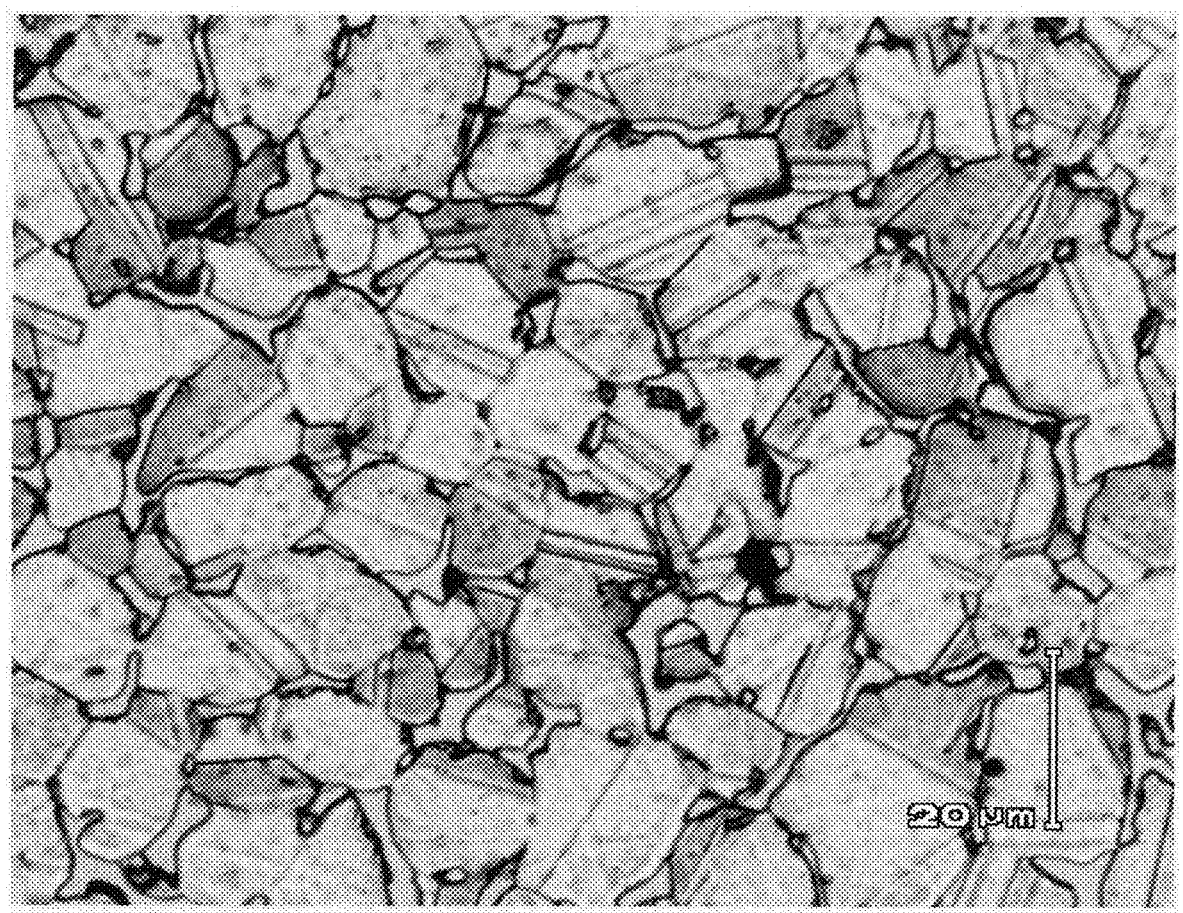
FIG. 4 is a micrograph showing the metallographic structure after a cooling treatment by thermal insulation of a brass alloy.
Figure 5:
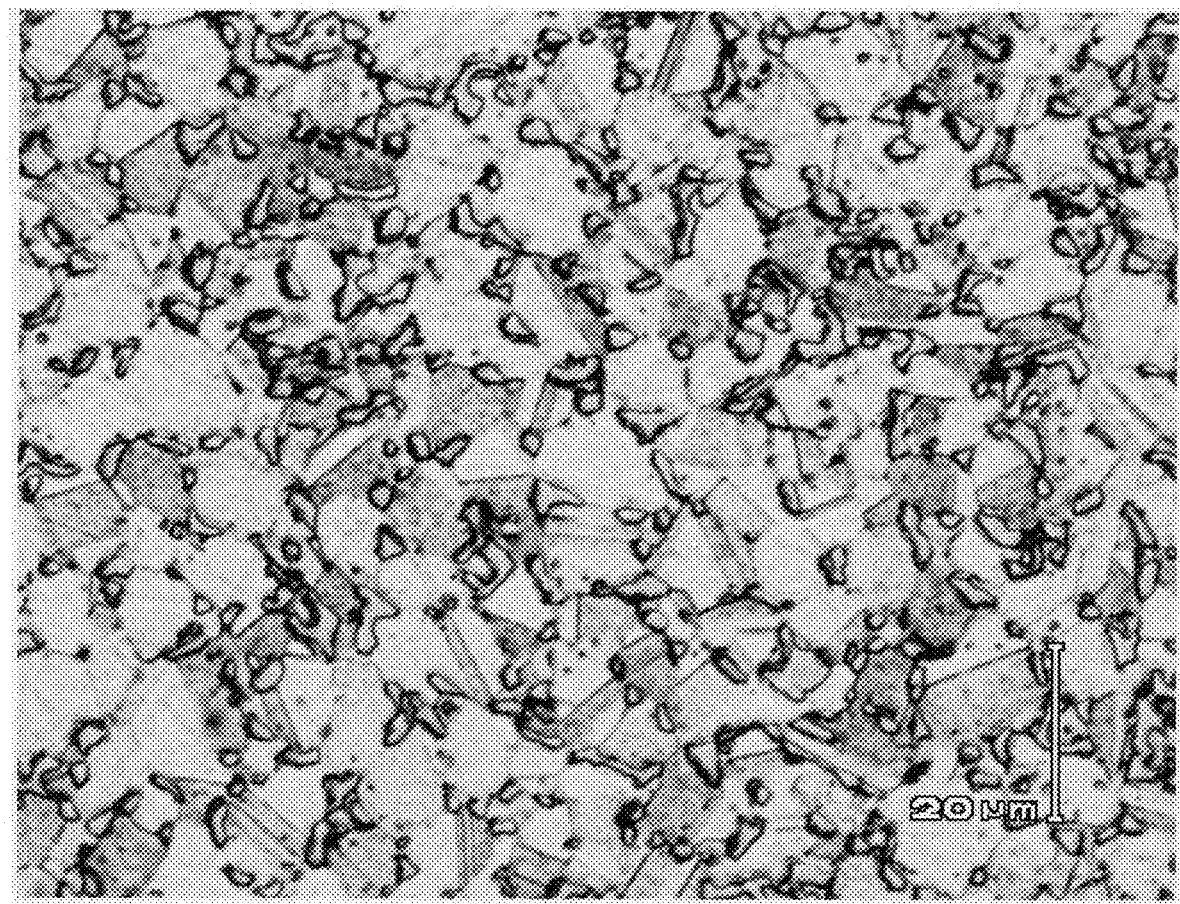
FIG. 5 is a micrograph showing the metallographic structure after a cooling treatment by water cooling of a brass alloy.

In the case of measurement of the crystal grain size of the above-described cylindrical raw material before forging, for example, a cutting method in JIS H 0501 "Methods for estimating average grain size of wrought copper and copper alloys" is adopted. In this case, the circular cross-sectional surface of the cylindrical raw material was an observation surface, the metallographic structure of a part situated at a distance of ⅓ from the outer periphery of the radius of this observation surface was displayed or photographed by an electronic microscope at a magnification of 500, and the number of crystal grains of an α phase when cut by line segments of known length was counted, and the crystal was measured by the average value of the cut lengths. In the present embodiment, rectangular parts as shown in FIG. 4 and FIG. 5 were excised from the displayed part of the electronic microscope as a part to be measured, and two diagonal lines were drawn on this rectangle, crystal grains cut by respective diagonal lines were used as measurement objects, and the average value of the cut lengths was determined from them.

Subsequently, in forging-molding the body 2, a mold form 10 and right and left punches 11, 12 shown in FIG. 3 are adopted. In FIG. 3(a), the inner side of the mold form 10 has a shape capable of forming the outer circumference shape of the body 2 in FIG. 2, and the outer side of the right and left punches 11, 12 has a shape capable of forming the inner circumference shape of the body 2. In working, the forging raw material 20 heated is accommodated in the mold form 10, and pressed to around the center from the right and left sides by the left punch 11 and the right punch 12 under this condition. In this operation, the forging raw material 20 deforms to the diameter expanding direction by the right and left punches 11, 12, and gets prescribed appearance shape along the inner circumference shape of the mold form 10, and also the inner circumference side deforms by the outer shape of the right and left punches 11, 12 and gests prescribed inner circumference shape. As described above, the body 2 having the appearance and the inner circumference of prescribed shape is molded from the forging raw material 20 by one press work by the right and left punches 11, 12.

The body 2 after hot forging is shown in FIG. 3(b). In forging work, the right and left punches 11, 12 do not penetrate the inner circumference side of the body 2 since the cylindrical raw material is used, thus, excess thickness 2a remains around the center of the body 2 as shown in the figure. If this excess thickness 2a is cut at the dashed line position shown in the figure and removed by cutting work, the body 2 having through-inside can be formed.

When the raw material 20 is hot forged to form the body 2 as described above, at a deformation part (screw part vested with cap) A deformed to the diameter expanding direction at the outer circumference side of the left punch 11 in FIG. 3(b), the forged diameter enlarges particularly with respect to the diameter of the raw material 20 before deformation, and becomes thinner. That is, at the deformation part A, the raw material 20 is relatively significantly extended by forging. At a deformation part (cavity part of ball valve 1) B deforming around the head of the right punch 12, the forged diameter is somewhat larger with respect to the diameter of the raw material 20, and becomes thicker. At a deformation part (a part of crossing of three points: thickness of a cavity part of a ball valve 1, thickness of a holding section of a ball sheet 4 and thickness of a screw part for pipe of a ball valve) C around the center of the inside of the body 2 deforming as pressed by the left punch 11 and the right punch 12, the forged diameter does not vary with respect to the diameter of the raw material 20, and becomes thicker. That is, at the deformation part C, a deformed state so that the raw material 20 is pushed is formed by forging.

When the degrees of working in these deformation parts A to C, namely deformation amounts, are compared relatively, the order thereof is as follows: the degree of working of a deformation part A>the degree of working of a deformation part B>the degree of working of a deformation part C. Based on this fact, a part having the degree of working equivalent to that of the deformation part A is called a region of high degree of working, a part having the degree of working equivalent to that of the deformation part B is called a region of middle degree of working, and a part having the degree of working equivalent to that of the deformation part C is called a region of low degree of working, hereinafter. That is, a region of low degree of working is a center region wherein deformation is scarcely observed in forging, a region of middle degree of working is an intermediate region adjacent to a region of low degree of working and formed by extrusion of a raw material into a cavity in the mold, and a region of high degree of working is an end region adjacent to a region of middle degree of working and formed by extrusion of a raw material into a cavity in the mold.

In measuring the crystal grain size at each site of the body (forged product) 2, the body 2 is cut so that it is divided around the deformation parts A to C in FIG. 3(b), and the crystal grain size of the cut surface at each site is measured according to Methods for estimating average grain size of wrought copper and copper alloys in JIS H 0501 described above. Since the crystal grain size becomes smaller when the degree of working becomes larger, the deformation part A was classified to a region showing high degree of working and having the finest crystal grain size, the deformation part B was classified to a region showing middle degree of working and having approximately middle crystal grain size and the deformation part C was classified to a region showing low degree of working having the coarsest crystal grain size, respectively, based on the measurement results, and the average crystal grain size of an α phase, the coarsening rate of the crystal grain size by comparison with the raw material 20 before forging, the maximum dezincification corrosion depth, and the ratio of the maximum dezincification corrosion depth to that of a region of high degree of working, in each region, were measured respectively. The results are shown in Table 2.

TABLE 2

| | average crystal grain size | crystal grain size coarsening rate | maximum dezincification corrosion depth | maximum dezincification corrosion depth ratio |
|---|---|---|---|---|
| raw material before forging | 5.7 μm | — | — | — |
| region of high degree of working | 7.3 μm | 28% | 68 μm | — |
| region of middle degree of working | 8.7 μm | 53% | 100 μm | about 1.5-fold |
| region of low degree of working | 10.9 μm | 91% | 191 μm | about 3-fold |

As the results in Table 2, when the crystal grain size of a hot forged product was measured at each site, the coarsening rate of the crystal grain size in a region of high degree of working by hot forging of the body 2 with respect to the raw material 20 before forging was 28%, and the maximum dezincification corrosion depth was 68 μm.

The crystal grain size coarsening rate of a region of middle degree of working of the body 2 with respect to the raw material 20 before forging was 53%, and under this condition, the maximum dezincification corrosion depth was 100 μm, slight lowering of a dezincification corrosion resistance was recognized in comparison with a region of high degree of working.

In contrast, the crystal grain size coarsening rate of a region of low degree of working of the body 2 was 91%, and under this condition, the maximum dezincification corrosion depth was 191 μm, and resultantly, about 3-fold dezincification corrosion depth was manifested in comparison with a region of high degree of working.

Since the absolute values of the maximum dezincification corrosion depth in Table 2 described above depend on the crystal grain size and the amount of residual working strain, the same result is not necessarily obtained in all forged products different in shape, size and the like.

However, it has been found that it is effective to suppress coarsening of the crystal grain size of an α phase of a raw material before forging as described later, for enhancing a dezincification corrosion resistance of a region of low degree of working by hot forging to the same level as that of a region of high degree of working.

Then, when the above-described measurement results are allowed to correspond to a maximum dezincification corrosion depth criterion of 200 μm in ISO dezincification corrosion resistance test, it can be concluded that suppression of the maximum dezincification corrosion depth to 200 μm or less is possible, if intending a crystal grain size coarsening rate of 50% or less which is approximately the same as the crystal grain size coarsening rate of an α phase of a region of middle degree of working having shown a maximum dezincification corrosion depth of 53% of a raw material before forging, in view of an increase of the dezincification corrosion depth depending on a site in a practical product. Further, the maximum dezincification corrosion depth can be suppressed lower if a crystal grain size coarsening rate of 30% or less which is the same level of a region of high degree of working is attained, in a desirable case.

Based on the findings as described above, heat history which is believed to exert a significant influence on growth of crystal grains in each step of hot forging was tested, for the purpose of finding means for suppressing coarsening of the crystal grain size in a hot forging step, for improving a dezincification resistance.

A part which is believed to have the lowest degree of working by hot forging of the above-described test piece is a part in which deformation is approximately zero, and it is supposed that this has crystalline structure which is approximately the same as that of a raw material before hot forging. For this reason, a raw material before hot forging was used as a test piece to be used in the following test, and change of the crystal grain size and a dezincification corrosion resistance when this test piece was endowed with heat history without hot forging were studied. The chemical components of the test piece in this case are shown in Table 3. The shape of the test piece was a cylinder like the raw material 20 for body of a ball valve described above, and its diameter was adjusted to 05 mm which is approximately the same as that of the raw material 20 for body and its length was adjusted to 40 mm which is somewhat shorter than that of the raw material 20 for body. Such somewhat shorter length is adopted for performing correct evaluation by difference of heat history by decreasing an influence by lowering of thermal conduction due to length.

TABLE 3

| | chemical component (% by mass) | | | | | | | |
|---|---|---|---|---|---|---|---|---|
| | Cu | Pb | Fe | Sn | P | Sb | Ni | Zn |
| test piece | 60.8 | 0.16 | 0.00 | 1.50 | 0.10 | 0.09 | 0.16 | residue |

The heating rate and the cooling rate after completion of heating were changed as heat history for raw materials (raw materials No. 1-1 to No. 3-8, 24 in total), and the results of evaluation of the crystal grain size and ISO dezincification corrosion resistance of them are shown in Table 4. There is no retention time for the heating temperature before forging. Heating is performed from ordinary temperature to 700° C. In this range, a range from 350° C. to 700° C. is a recrystallization temperature range, and Table 4 shows the heating rate in this temperature range. In the table, "thermal insulation" denotes gradual cooling, and for example, denotes cooling gradually by wrapping with a thermal protective material and the like to block outside air. In Table 4, a column of a forging step is provided for convenience of explanation, however, this forging step is only supposition, and a forging step was not conducted in this test.

TABLE 4

| step item | preparation of raw material crystal grain size (μm) | heating heating rate (° C./s) 350° C.→700° C. | | forging forging temperature (° C.) | cooling cooling manner | cooling rate (° C./s) 700° C.→ 350° C. | cooling crystal grain size average crystal grain size (μm) | cooling crystal grain size coarsening rate (%) | α transition annealing presence or absence of thermal treatment (470° C., 2.5 h) | ISO maximum dezincification depth (μm) |
|---|---|---|---|---|---|---|---|---|---|---|
| test condition | 6.0 | 1. heating time: 10 min to 23 min | No. 1-1 1.0 | 700 | a. thermal insulation | 0.3 | 11.2 | 87 | presence | 36 |
| | | | 1-2 0.9 | | | 0.2 | 11.1 | 86 | absence | 462 |
| | | | 1-3 0.9 | | b. radiational cooling | 1.1 | 10.6 | 77 | presence | 35 |
| | | | 1-4 0.9 | | | 1.0 | 10.9 | 82 | absence | 437 |
| | | | 1-5 0.5 | | c. forced air cooling | 2.0 | 9.2 | 54 | presence | 44 |
| | | | 1-6 0.9 | | | 1.9 | 9.9 | 65 | absence | 304 |
| | | | 1-7 0.8 | | d. water cooling | 115.9 | 9.4 | 57 | presence | 27 |
| | | | 1-8 0.7 | | | 98.2 | 8.7 | 45 | absence | 23 |
| | | 2. heating time: 6 min to 9 min | No. 2-1 1.6 | | a. thermal insulation | 0.3 | 11.1 | 86 | presence | 32 |
| | | | 2-2 1.7 | | | 0.2 | 10.8 | 81 | absence | 392 |
| | | | 2-3 1.5 | | b. radiational cooling | 1.0 | 11.3 | 89 | presence | 30 |
| | | | 2-4 1.6 | | | 1.0 | 10.5 | 75 | absence | 402 |
| | | | 2-5 1.5 | | c. forced air cooling | 1.7 | 9.5 | 59 | presence | 22 |
| | | | 2-6 1.6 | | | 1.5 | 9.2 | 54 | absence | 300 |
| | | | 2-7 1.5 | | d. water cooling | 142.6 | 7.9 | 32 | presence | 17 |
| | | | 2-8 1.5 | | | 118.9 | 7.6 | 27 | absence | 10 |
| | | 3. heating time: 2 min to 3 min | No. 3-1 5.2 | | a. thermal insulation | 0.3 | 10.3 | 72 | presence | 42 |
| | | | 3-2 5.1 | | | 0.2 | 9.8 | 64 | absence | 381 |
| | | | 3-3 5.4 | | b. radiational cooling | 1.1 | 9.5 | 59 | presence | 23 |
| | | | 3-4 5.6 | | | 1.1 | 9.5 | 59 | absence | 396 |
| | | | 3-5 5.5 | | c. forced air cooling | 2.1 | 7.0 | 17 | presence | 19 |
| | | | 3-6 5.3 | | | 2.0 | 8.6 | 44 | absence | 269 |
| | | | 3-7 4.5 | | d. water cooling | 141.7 | 5.8 | 97 | presence | 19 |
| | | | 3-8 4.7 | | | 140.5 | 7.2 | 20 | absence | 25 |

From the test results in Table 4, it has become apparent that the heating rate and the cooling rate after completion of heating affect dezincification corrosiveness irrespective of the presence or absence of heating at the forging work temperature supposed and a thermal treatment by α transition annealing after cooling. That is, it has been found that a dezincification corrosion resistance is improved when the heating rate of a raw material in forging is faster, and further, when heat history causing faster cooling rate is applied.

Regarding a relation between the heating rate of a raw material and the crystal grain size, the average values of each of the heating temperature (° C./s), the average crystal grain size (μm) of an α phase after heating and cooling and the coarsening rate (%) of the average crystal grain size with respect to the crystal grain size of a raw material of raw materials No. 1-1 to No. 1-8 (8 in total), raw materials No. 2-1 to No 2-8 (8 in total) and raw materials No. 3-1 to No. 3-8 (8 in total) were measured under each condition of (1) the heating time: 10 min to 23 min, (2) the heating time: 6 min to 9 min and (3) the heating time: 2 to 3 min, which are heating conditions shown in Table 4, and the results under each heating condition are summarized by these average values and shown in Table 5.

TABLE 5

| | | heating time: 10 min to 23 min | heating time: 6 min to 9 min | heating time: 2 min to 3 min |
|---|---|---|---|---|
| average value | heating rate (° C./s) | 0.8 | 1.6 | 5.2 |
| | average crystal grain size (μm) | 10.1 | 9.7 | 8.5 |

TABLE 5-continued

| | heating time: 10 min to 23 min | heating time: 6 min to 9 min | heating time: 2 min to 3 min |
|---|---|---|---|
| grain size coarsening rate (%) | 68 | 61 | 42 |

It has been confirmed from a relation between the heating rate and the grain size coarsening rate shown in Table 5 that when the heating rate becomes faster, the average crystal grain size becomes smaller, and when the heating rate is 5.2° C./s or more (heating time: 2 min to 3 min), it is possible to suppress the maximum dezincification corrosion depth to 200 μm or less, and growth of the crystal grain size is suppressed to a grain size coarsening rate of 42% which is not higher than a grain size coarsening rate of 50%. In this case, the average crystal grain size is 8.5 μm.

A heating rate of 5.2° C./s or more is definition of the heating rate capable of suppressing coarsening of the crystal grain to the required level, and even if the heating rate higher than this is accomplished, the constitution of the crystalline structure does not change, and coarsening of the crystal grain size is only suppressed more effectively. Therefore, even if the heating rate by far exceeding 5.2° C./s is realized, the crystal grain size only comes close to the crystal grain size of a raw material before heating, and as a result, the crystal grain size of the resultant forged product reveals no large difference in comparison with a forged product obtained by a heating rate of 5.2° C./s.

For this reason, a heating rate of 5.2° C./s or more (upper limit is not defined), and an average crystal grain size of an α phase of 8.5 μm or less suppressing the grain size coarsening rate to 50% or less (42%) are recommendable.

In Table 4, a test is conducted at a heating rate of 5.2 to 5.6° C./s for (3) a heating time of 2 to 3 minutes. Heating is performed from ordinary temperature to the forging temperature. In this range, a range of 350° C. to the forging temperature is a recrystallization temperature range, and in this temperature range, heating is performed at a heating rate of 5.2° C./s or more.

The lead-free brass according to the present invention can be forging-worked at 670 to 790° C., according to the results of the hot deformation resistance test by the present inventors. In view of the hot cracking and corrosiveness of a forged product, 700° C. to 760° C. in which a needle structure is not generated and sufficient hot plastic workability is obtained are more suitable.

Therefore, it is advantageous that the forging temperature in the present invention is set between 670° C. to 790° C., more preferably between 700° C. to 760° C.

Subsequently, regarding a relation between the crystal grain size and the cooling rate in cooling after completion of heating of a raw material, the cooling rate was changed by a. thermal insulation, b. radiational cooling, c. forced air cooling and d. water cooling which are cooling methods shown in Table 4, and the average values of each of the cooling temperature (° C./s) of a raw material, the average crystal grain size (μm) of an α phase after cooling and the coarsening rate (%) of the average crystal grain size with respect to the crystal grain size of a raw material were determined for every conditions, and the results under each heating condition are summarized by these average values and shown in Table 6.

TABLE 6

|  |  | a. thermal insulation | b. radiational cooling | c. forced air cooling | d. water cooling |
|---|---|---|---|---|---|
| average value | heating rate (° C./s) | 0.3 | 1.1 | 1.9 | 126.3 |
|  | average crystal grain size (μm) | 10.7 | 10.4 | 8.9 | 7.8 |
|  | grain size coarsening rate (%) | 78 | 73 | 48 | 30 |

When a relation between the cooling rate and the average crystal grain size of an α phase shown in Table 6, when the cooling rate becomes faster, the average crystal grain size becomes smaller, and particularly, when the cooling rate is 126.3° C./s or more, a coarsening rate of 30% or less which is the coarsening rate of the crystal grain size which is approximately the same as in the case of a region of high degree of working by hot forging in Table 2 is resultantly attained. When the cooling rate is 1.9° C./s or more, 48% which is not higher than a coarsening rate of the crystal grain size of 50% which is approximately the same as in the case of a region of middle degree of working in Table 2.

Regarding a relation between the cooling rate and the average crystal grain size of an α phase in Table 4, particularly regarding a relation between the cooling rate and the crystal grain size when the heating rate is 5.2° C./s or more and (3) the heating time is 2 min to 3 min, data are summarized using average values and the results are shown in Table 7.

TABLE 7

|  |  | a. thermal insulation | b. radiational cooling | c. forced air cooling | d. water cooling |
|---|---|---|---|---|---|
| average value | heating rate (° C./s) | 0.2 | 1.1 | 2.0 | 141.1 |
|  | average crystal grain size (μm) | 10.1 | 9.5 | 7.8 | 6.5 |
|  | grain size coarsening rate (%) | 68 | 58 | 30 | 8.3 |

According to the results in Table 7, a grain size coarsening rate of 30% or less can be attained when the cooling rate is 2° C./s or more as in c. forced air cooling and d. water cooling if the heating rate is 5.2° C./s or more.

According to the above descriptions, a dezincification resistance can be improved while suppressing coarsening of the crystal grain size of an α phase in any regions from the deformation part A to the deformation part C of different degree of working of the body 2, by subjecting a lead-free brass alloy having a composition in the range described above to forging work by heating at a heating rate of 5.2° C./s or more from 350° C. until reaching the forging temperature, in the present invention. Therefore, particularly, a dezincification resistance can be assured sufficiently and dezincification corrosion by a fluid can be prevented even at a region near the deformation part C which is a region of low degree of working and situated around a wetted portion. In this case, the heating temperature of a raw material to be subjected to forging work is controlled from 350° C. to the forging temperature since coarsening of a crystal tends to occur in this temperature range. The coarsening rate of the crystal grain size can be suppressed to 50% or less by conducting heating at a heating rate of 5.2° C./s or more as described above.

Further, when the heating rate is 5.2° C./s or more from 350° C. until reaching the forging temperature, and then, when the cooling rate from the forging temperature to 350° C. after forging is 2° C./s, generation of coarsening of a crystal liable to occur in this temperature range can be prevented, and particularly, when the cooling rate is 2° C./s or more, the coarsening rate of the crystal grain size can be suppressed to a smaller value of 30% or less.

When the heating rate is 5.2° C./s or more from 350° C. until reaching forging temperature and when the cooling rate from the forging temperature to 350° C. after forging is 2° C./s or more and less than 142° C./s, more preferably less than 98° C./s, fine fragmentation of a γ phase depositing in the crystalline structure after α transition annealing, possibly occurring when over 142° C./s, can be prevented while suppressing the coarsening rate of a crystal to 30% or less, and lowering of a corrosion cracking resistance ascribable to this can also be prevented.

FIG. 4 and FIG. 5 show micrographs (magnification: 500-fold) of the metallographic structure of a brass alloy thermally-treated according to the test conditions described in Table 4 for the test piece in Table 3. As the thermal treatment condition in this case, a brass alloy having a composition in the range described above was heated at a heating rate of 5.2° C./s from 350° C. to the forging temperature in both the cases. Further, the brass alloy in FIG.

4 was cooled at a cooling rate in a. thermal insulation in Table 4 and the subjected to α transition annealing, while the brass alloy in FIG. 5 was cooled at a cooling rate in d. water cooling in Table 4 and then subjected to α transition annealing.

It has been confirmed as shown in the figures that miniaturization is possible by suppressing coarsening of the crystal grain of an α phase in any cases, and by this, elements such as Sn are diffused easily between crystal grains after α transition annealing, and forging molding can be carried out while improving a dezincification resistance. Further, the average crystal grain size of an α phase can be made smaller and a brass alloy having a more improved dezincification resistance can be fabricated in the case of a cooling treatment by d. water cooling in FIG. 5 than in the case of a cooling treatment by a. thermal insulation in FIG. 4.

Figure 6:
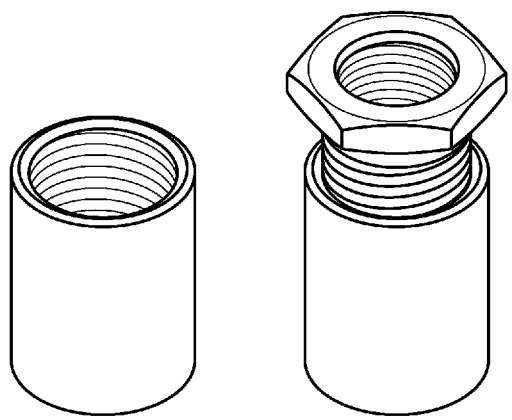
FIG. 6 is a photography showing a test piece.

As a typical corrosion resistance other than the dezincification resistance described above, a stress corrosion cracking resistance (SCC resistance) is mentioned. For evaluation of this stress corrosion cracking resistance, a hot forged product molded by the method of producing a hot forged product of the present invention was subjected to the following test. As a test piece in this case, a bar is worked by a NC working machine into φ25×35 (Rc ½ threaded SCC sample) shown in FIG. 6.

As test conditions, the driving torque of a stainless bushing is 9.8 N·m (100 kgf·cm), the ammonia concentration is 14%, and the test chamber temperature is controlled around 20° C. The number of samples of each material is n=3. In the stress corrosion cracking test, a bushing-threaded sample was placed in a desiccator in an atmosphere having an ammonia concentration of 14%, then, taken out at any time, washed with 10% sulfuric acid, then, observed. Observation was conducted using a stereoscopic microscope (magnification: 10-fold), and generation of no cracking is judged to ○, generation of fine cracking (½ or less of thickness) is judged to Δ, generation of cracking of ½ or more of thickness is judged to ▲, and generation of thickness penetrating cracking is judged to x. For quantitatively representing the judgement after the test, the following criterion: ○: 3 points, Δ: 2 points, ▲: 1 point and x: 0 point was applied, and numerical values obtained by multiplying the point by the test time were summed for every standard and the total score was evaluated.

As the evaluation criterion of a stress corrosion cracking resistance, a lead-containing brass material having caused almost no problem by stress corrosion cracking until now is used as a criterion, for evaluating a stress corrosion cracking resistance of a brass according to the production method of the present invention. The standard of the stress corrosion cracking test time is 16 hours, 24 hours, 48 hours and 72 hours. Table 8 shows the chemical component values of a lead-containing brass material, Table 9 shows the results of the stress corrosion cracking resistance test and Table 10 shows the results of point evaluation, respectively.

TABLE 8 chemical component value of lead-containing brass material (% by mass)

| raw material | Cu | Zn | Pb | Fe | Sn |
|---|---|---|---|---|---|
| lead-containing brass material (C3771) | 59.2 | residue | 2.2 | 0.09 | 0.23 |

TABLE 9 result of stress corrosion cracking resistance test of lead-containing brass material

| raw material | n | 16 h | 24 h | 48 h | 72 h |
|---|---|---|---|---|---|
| lead-containing brass material (C3771) | 1 | xx | xx | xx | xx |
| | 2 | xx | xx | xx | xx |
| | 3 | Δ | xx | xx | xx |

TABLE 10 result of point calculation of stress corrosion cracking resistance test of lead-containing brass material

| raw material | n | 16 h | 24 h | 48 h | 72 h | total point | perfect score | score proportion |
|---|---|---|---|---|---|---|---|---|
| lead-containing brass material (C3771) | 1 | 0 | 0 | 0 | 0 | 32 | 1440 | 2.2% |
| | 2 | 0 | 0 | 0 | 0 | | | |
| | 3 | 32 | 0 | 0 | 0 | | | |

From the results of the stress corrosion cracking resistance test of the lead-containing brass material described above, the total score is 32 points, and the score proportion considering a perfect score of 1440 points can be calculated to 2.2%, and this is used as a criterion. That is, when the score proportion obtained in the stress corrosion cracking resistance test of a developing material is 2.2% or more, the material is believed to be roughly excellent in a stress corrosion cracking resistance.

As a result of the stress corrosion cracking resistance test of the lead-containing brass, thickness penetrating cracking occurred for the first time at a time of 16 hours. Therefore, no generation of thickness penetrating cracking at a time of 16 hours or less when conducting the stress corrosion cracking resistance test is also mentioned as one criterion, and a SCC property is judged to be stable.

From these facts, the condition of a brass alloy excellent in a stress corrosion cracking resistance includes (1) a score proportion of 2.2% or more and (2) no generation of thickness penetrating cracking at a time of 16 hours or less, when the stress corrosion cracking resistance test described above is carried out.

Further, for examining the case of a thermal treatment by water cooling and radiational cooling, a stress corrosion cracking test was conducted on a hot forged product molded by the production method of the present invention and a comparative material. The test results are shown below.

Table 11 shows the chemical component values of the test piece used in this test, and Table 12 shows the results of the stress corrosion cracking resistance test and the score proportion. This test was conducted at a test time standard of 16 hours, 24 hours, 48 hours and 72 hours.

TABLE 11

| | chemical component (% by mass) | | | | | | | |
|---|---|---|---|---|---|---|---|---|
| | Cu | Pb | Fe | Sn | P | Sb | Ni | Zn |
| test piece | 60.8 | 0.16 | 0.00 | 1.50 | 0.10 | 0.09 | 0.16 | residue |

TABLE 12 result of stress corrosion cracking resistance test in water cooling and radiational cooling

| material, step, bar diameter standard | n | result of stress corrosion cracking test 16 h | 24 h | 48 h | 72 h | point 16 | 24 | 48 | 72 | score 16 h | 24 h | 48 h | 72 h | sum | perfect score | score proportion (%) |
|---|---|---|---|---|---|---|---|---|---|---|---|---|---|---|---|---|
| test piece 1 700° C. heating → water cooling | 1 | ▲ | ▲ | xx | ▲ | 1 | 1 | 0 | 1 | 16 | 24 | 0 | 72 | 360 | 1440 | 25.0% |
| | 2 | ▲ | ▲ | xx | xx | 1 | 1 | 0 | 0 | 16 | 24 | 0 | 0 | | | |
| | 3 | ▲ | ▲ | Δ | ▲ | 1 | 1 | 2 | 1 | 16 | 24 | 96 | 72 | | | |
| test piece 2 700° C. heating → radiational cooling | 1 | Δ | Δ | ▲ | Δ | 2 | 2 | 1 | 2 | 32 | 48 | 48 | 144 | 728 | 1440 | 50.6% |
| | 2 | Δ | Δ | ▲ | ▲ | 1 | 2 | 1 | 1 | 16 | 48 | 48 | 72 | | | |
| | 3 | Δ | Δ | ▲ | Δ | 2 | 2 | 1 | 2 | 32 | 48 | 48 | 144 | | | |
| C3771 — | 1 | xx | xx | xx | xx | 0 | 0 | 0 | 0 | 0 | 0 | 0 | 0 | 32 | 1440 | 2.2% |
| | 2 | xx | xx | xx | xx | 0 | 0 | 0 | 0 | 0 | 0 | 0 | 0 | | | |
| | 3 | Δ | xx | xx | xx | 2 | 0 | 0 | 0 | 32 | 0 | 0 | 0 | | | |

It is understood from the results in Table 12 that the score proportions in water cooling and radiational cooling are 25.0% and 50.6%, respectively, these are over 2.2% as the criterion, and both the test pieces have a SCC resistance equal to or more than that of C3771. When water cooling and radiational cooling were compared, it was confirmed that radiational cooling shows a more excellent SCC resistance.

Figure 7:
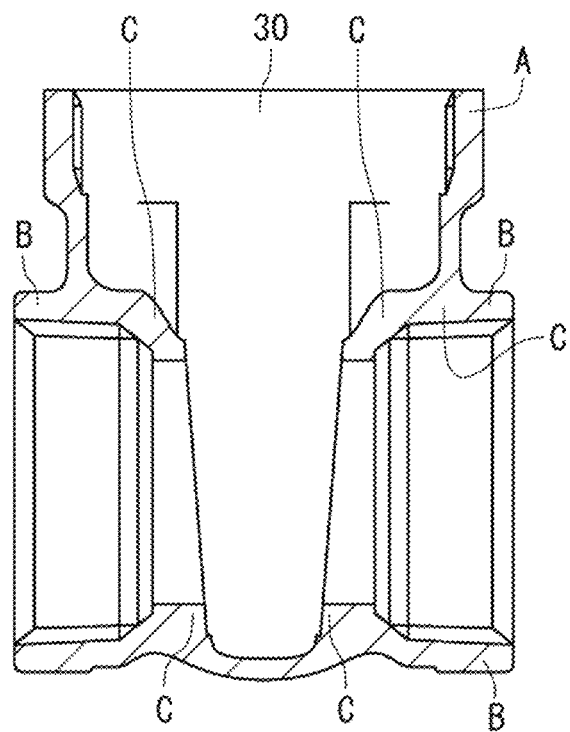
FIG. 7 is a cross-sectional view showing a body of a gate valve.

FIG. 7 shows one example of a body of a gate valve.

Also when molding such a body 30 by hot forging using a lead-free brass material, the deformation part A is a region of high degree of working, the deformation part B is a region of middle degree of working and the deformation part C is a region of low degree of working like the case of the body 2 of a ball valve described above, thus, if the body 30 is molded by hot forging like the case of the body 2, coarsening of the crystal grain size of an can be prevented and a dezincification resistance can be improved, and further, a stress corrosion cracking resistance can also be improved like the above-described case.

Further, the method of producing a hot forged product of the present invention is particularly effective when one forged product is hot forged and when a forged product showing significantly different degree of working depending on the site is molded, and the method can prevent coarsening of the whole crystal grain size and can improve corrosion resistances such as a dezincification resistance and the like. For this reason, the method can be utilized also in various forged products other than a valve body.

The hot forged product using a brass according to the present invention can be applied widely as a suitable material in members and parts, particularly, water-contact parts such as a valve, a water faucet and the like, that is, ball valves, hollow balls for ball valve, butterfly valves, gate valves, globe valves, check valves, valve stems, water supply plugs, mounting hardwares of a hot water dispenser, a warm water shower toilet seat and the like, water supply pipes, connecting pipes and pipe joints, refrigerant pipes, electric water heater parts (casing, gas nozzle, pump part, burner, etc.), strainers, water meter parts, underwater sewage line parts, drainage plugs, elbow pipes, tees pipes, bellows, toilet bowl connecting flanges, spindles, joints, headers, corporation cocks, hose nipples, water faucet-attached metal fittings, stop cocks, water supply, drainage and distribution plug equipments, sanitary ware metal fittings, shower hose connecting metal fittings, gas apparatuses, architectural materials such as a door, a knob and the like, house electric appliances, sheath pipe header adapters, automobile cooler parts, fishing tackle parts, microscope parts, water meter parts, measuring apparatus parts, railway pantograph parts, and, other members and parts. Further, the hot forged product can be widely applied also in toilet articles, kitchen utensils, bathroom products, washroom articles, furniture parts, living room commodities, sprinkler parts, door parts, gate parts, automatic vending machine parts, washing machine parts, air conditioner parts, gas welding machine parts, heat exchanger parts, solar-powered water heater parts, dies and parts thereof, bearings, gears, construction machine parts, railway vehicle parts, transportation unit parts, raw materials, intermediate products, final products and assembled products, and the like. Of them, especially a forged product of an elbow pipe is suitably molded by the production method of the present invention when forged in the form of a solid not in the form of a hollow.

EXPLANATION OF NUMERALS 1 ball valve
2 body
10 mold form
11 left punch
12 right punch
20 raw material

The invention claimed is:

1. A method of producing a hot forged product using a brass, comprising heat-treating a raw material to be subjected to forging work using a brass having a composition containing at least 59.2 to 63.0% by mass of Cu, 1.00 to 2.00% by mass of Sn, 0.05 to 0.25% by mass of Pb, and the remainder comprising Zn and inevitable impurities at a heating rate of 5.2° C./s or more from 350° C. until reaching a forging temperature, and hot forging the raw material.

2. The method of producing a hot forged product using a brass according to claim 1, wherein the brass contains 0.05 to 0.29% by mass of Sb and/or 0.05 to 0.20% by mass of P.

3. The method of producing a hot forged product using a brass according to claim 2, wherein the brass contains 0.15% by mass or less of Fe.

4. The method of producing a hot forged product using a brass according to claim 1, wherein the brass contains 0.05 to 0.29% by mass of Sb and 0.15% by mass or less of Ni.

5. The method of producing a hot forged product using a brass according to claim 4, wherein the brass contains 0.05 to 0.20% by mass of P.

6. A method of producing a hot forged product using a brass, comprising heating a raw material to be subjected to forging work using a brass having a composition containing 59.2 to 63.0% by mass of Cu, 1.00 to 2.00% by mass of Sn, 0.05 to 0.25% by mass of Pb, and the remainder comprising Zn and inevitable impurities from 350° C. until reaching a forging temperature, and hot forging the raw material, wherein the hot forged product comprises at least a region A of a high degree of working, a region B of an middle degree of working, and a region C of a low degree of working, and the degree of working in the regions corresponds to an amount of deformation such that regions A, B and C satisfy the following formula:

the degree of working of region A>the degree of working of region B>the degree of working of region C;

wherein the heating rate of the raw material is set so that a coarsening rate of a crystal grain size in the region C by hot forging is 50% or less, and wherein an average crystal grain size of an α phase of the region C of the hot forged product is 8.5 μm or less.

7. The method of producing a hot forged product using a brass according to claim 6, wherein the brass contains 0.05 to 0.29% by mass of Sb and/or 0.05 to 0.20% by mass of P.

8. The method of producing a hot forged product using a brass according to claim 7, wherein the brass contains 0.15% by mass or less of Fe.

9. The method of producing a hot forged product using a brass according to claim 6, wherein the brass contains 0.05 to 0.29% by mass of Sb and 0.15% by mass or less of Ni.

10. The method of producing a hot forged product using a brass according to claim 9, wherein the brass contains 0.05 to 0.20% by mass of P.

11. A method of producing a hot forged product using a brass, comprising heating a raw material to be subjected to forging work using a brass having a composition containing at least 59.2 to 63.0% by mass of Cu, 1.00 to 2.00% by mass of Sn, 0.05 to 0.25% by mass of Pb, and the remainder comprising Zn and inevitable impurities at a heating rate of 5.2° C./s or more from 350° C. until reaching a forging temperature, and hot forging the raw material, wherein a cooling rate from the forging temperature to 350° C. after forging is 2° C./s or more.

12. The method of producing a hot forged product using a brass according to claim 11, wherein the brass contains 0.05 to 0.29% by mass of Sb and/or 0.05 to 0.20% by mass of P.

13. The method of producing a hot forged product using a brass according to claim 12, wherein the brass contains 0.15% by mass or less of Fe.

14. The method of producing a hot forged product using a brass according to claim 11, wherein the brass contains 0.05 to 0.29% by mass of Sb and 0.15% by mass or less of Ni.

15. The method of producing a hot forged product using a brass according to claim 14, wherein the brass contains 0.05 to 0.20% by mass of P.

16. A method of producing a hot forged product using a brass, comprising heating a raw material to be subjected to forging work using a brass having a composition containing at least 59.2 to 63.0% by mass of Cu, 1.00 to 2.00% by mass of Sn, 0.05 to 0.25% by mass of Pb, and the remainder comprising Zn and inevitable impurities at a heating rate of 5.2° C./s or more from 350° C. until reaching a forging temperature, and hot forging the raw material, wherein a cooling rate from the forging temperature to 350° C. after forging is 2° C./s or more and less than 142° C./s.

17. The method of producing a hot forged product using a brass according to claim 16, wherein the brass contains 0.05 to 0.29% by mass of Sb and/or 0.05 to 0.20% by mass of P.

18. The method of producing a hot forged product using a brass according to claim 17, wherein the brass contains 0.15% by mass or less of Fe.

19. The method of producing a hot forged product using a brass according to claim 16, wherein the brass contains 0.05 to 0.29% by mass of Sb and 0.15% by mass or less of Ni.

20. The method of producing a hot forged product using a brass according to claim 19, wherein the brass contains 0.05 to 0.20% by mass of P.

* * * * *